United States Patent
Yang (10) Patent No.: US 10,555,351 B2
(45) Date of Patent: Feb. 4, 2020

(54) MECHANISM TO EXTEND IE TYPE IN GTP

(71) Applicant: Telefonaktiebolaget LM Ericsson (publ), Stockholm (SE)

(72) Inventor: Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/755,781

(22) PCT Filed: Aug. 19, 2016

(86) PCT No.: PCT/EP2016/069698
§ 371 (c)(1),
(2) Date: Feb. 27, 2018

(87) PCT Pub. No.: WO2017/050496
PCT Pub. Date: Mar. 30, 2017

(65) Prior Publication Data
US 2019/0037618 A1    Jan. 31, 2019

Related U.S. Application Data

(60) Provisional application No. 62/232,517, filed on Sep. 25, 2015.

(51) Int. Cl.
*H04W 76/12* (2018.01)
*H04L 12/741* (2013.01)
(Continued)

(52) U.S. Cl.
CPC ......... *H04W 76/12* (2018.02); *H04L 12/4633* (2013.01); *H04L 45/74* (2013.01);
(Continued)

(58) Field of Classification Search
CPC .... H04W 36/32; H04W 88/02; H04L 61/2007
(Continued)

(56) References Cited

U.S. PATENT DOCUMENTS

2007/0162289 A1   7/2007 Olsson et al.
2013/0114658 A1   5/2013 Davydov et al.
(Continued)

FOREIGN PATENT DOCUMENTS

WO   2014187875 A1   11/2014

OTHER PUBLICATIONS

Author Unknown, "Technical Specification Group Core Network and Terminals; General Packet Radio Service (GPRS); GPRS Tunnelling Protocol (GTP) across the Gn and Gp interface (Release 13)," Technical Specification 29.060, Version 13.1.0, 3GPP Organizational Partners, Jun. 2015, 186 pages.
(Continued)

*Primary Examiner* — Iqbal Zaidi
(74) *Attorney, Agent, or Firm* — Withrow & Terranova, PLLC (57) ABSTRACT

A core network node creates a General Packet Radio Service, GPRS, Tunneling Protocol, GTP, message, which GTP message comprises a GTP header followed by at least one information element, IE, associated with a special IE type in a set of predefined IE types and which IE comprises a plurality of fields wherein the special IE type is identified by a value encoded in a predefined IE Type Field in a first Octet of the IE, the method comprising: reserving an IE Type Extension field in a fourth and fifth octet of the IE or in a fifth and sixth octet of the IE, for enabling a definition of an additional set of new IE types being an extension of the special IE type; and configuring the reserved IE Type Extension field so as to define at least one new IE type in addition to the predefined set of IE types.

10 Claims, 7 Drawing Sheets

(51) Int. Cl.
  *H04L 29/06* (2006.01)
  *H04L 12/46* (2006.01)
  *H04W 92/02* (2009.01)
  *H04W 76/11* (2018.01)

(52) U.S. Cl.
  CPC ............. *H04L 69/22* (2013.01); *H04W 76/11* (2018.02); *H04W 92/02* (2013.01)

(58) Field of Classification Search
  USPC .................................................. 370/252–339
  See application file for complete search history.

(56) References Cited

U.S. PATENT DOCUMENTS

| | | | |
|---|---|---|---|
| 2013/0265938 A1 | 10/2013 | Jain et al. | |
| 2014/0011514 A1 | 1/2014 | Gu et al. | |
| 2015/0358480 A1* | 12/2015 | Sharma | H04M 15/65 370/328 |
| 2016/0156753 A1* | 6/2016 | Gulbani | H04W 76/11 370/474 |
| 2018/0184297 A1* | 6/2018 | Mohamed | H04L 63/0892 |

OTHER PUBLICATIONS

Author Unknown, "Technical Specification Group Core Network and Terminals; 3GPP Evolved Packet System (EPS); Evolved General Packet Radio Service (GPRS); Tunnelling Protocol for Control plane (GTPv2-C); Stage 3 (Release 13)," Technical Specification 29.274, Version 13.2.0, 3GPP Organizational Partners, Jun. 2015, 319 pages.

Author Unknown, "Technical Specification Group Core Network and Terminals; 3GPP Evolved Packet System (EPS); Optimized Handover Procedures and Protocols between E-UTRAN access and cdma2000 HRPD Access; Stage 3 (Release 12)," Technical Specification 29.276, Version 12.3.0, 3GPP Organizational Partners, Dec. 2014, 25 pages.

Author Unknown, "Technical Specification Group Core Network and Terminals; Evolved Packet System (EPS); 3GPP Sv interface (MME to MSC, and SGSN and MSC) for SRVCC (Release 12)," Technical Specification 29.280, Version 12.3.0, 3GPP Organizational Partners, Mar. 2015, 23 pages.

Author Unknown, "Technical Specification Group Services and System Aspects; Telecommunication management; Charging management; Charging Data Record (CDR) transfer (Release 12)," Technical Specification 32.295, Version 12.2.0, 3GPP Organizational Partners, Dec. 2014, 39 pages.

Ericsson, "C4-15xyza: Extension of GTPv1 IE type," Change Request for Technical Specification 29.060, Version 13.2.0, Third Generation Partnership Project (3GPP) TSG CT4 Meeting #70, Oct. 12-16, 2015, 19 pages, Belgrade, Serbia.

Ericsson, "C4-15xyza: Extension of GTPv2 IE type," Change Request for Technical Specification 29.274, Version 13.3.0, Third Generation Partnership Project (3GPP) TSG CT4 Meeting #70, Oct. 12-16, 2015, 19 pages, Belgrade, Serbia.

International Search Report and Written Opinion for International Patent Application No. PCT/EP2016/069698, dated Nov. 29, 2016, 8 pages.

Author Unknown, "Technical Specification Group Core Network and Terminals; General Packet Radio Service (GPRS); GPRS Tunnelling Protocol (GTP) across the Gn and Gp interface (Release 13)," Technical Specification 29.060, Version 13.2.0, 3GPP Organizational Partners, Sep. 2015, 186 pages.

Ericsson, "C4-082599: Handling of IEs in GTP," 3GPP TSG CT WG4 Meeting #40, Pheonix, USA, Oct. 6-10, 2008, 15 pages.

Ericsson et al., "C4-151760: Extension of GTPv2 IE type," Change Request for Technical Specification 29.274, Version 13.3.0, 3GPP TSG CT4 Meeting #70bis, Oct. 12-16, 2015, Belgrade, Serbia, 6 pages.

Ericsson et al., "C4-151761: IE type extension," Change Request for Technical Specification 29.060, Version 13.2.0, 3GPP TSG CT4 Meeting #70bis, Oct. 12-16, 2015, Belgrade, Serbia, 6 pages.

Search Report for Japanese Patent Application No. 2018-514812, dated Feb. 13, 2019, 24 pages.

Decision to Grant for Japanese Patent Application No. 2018-514812, dated Mar. 5, 2019, 5 pages.

* cited by examiner

| Octets | Bits 8 | 7 | 6 | 5 | 4 | 3 | 2 | 1 |
|---|---|---|---|---|---|---|---|---|
| 1 | Version | | | PT | (*) | E | S | PN |
| 2 | Message Type ||||||||
| 3 | Length (1$^{st}$ Octet) ||||||||
| 4 | Length (2$^{nd}$ Octet) ||||||||
| 5 | Tunnel Endpoint Identifier (1$^{st}$ Octet) ||||||||
| 6 | Tunnel Endpoint Identifier (2$^{nd}$ Octet) ||||||||
| 7 | Tunnel Endpoint Identifier (3$^{rd}$ Octet) ||||||||
| 8 | Tunnel Endpoint Identifier (4$^{th}$ Octet) ||||||||
| 9 | Sequence Number (1$^{st}$ Octet)$^{1) \, 4)}$ ||||||||
| 10 | Sequence Number (2$^{nd}$ Octet)$^{1) \, 4)}$ ||||||||
| 11 | N-PDU Number$^{2) \, 4)}$ ||||||||
| 12 | Next Extension Header Type$^{3) \, 4)}$ ||||||||

GTP Header

NOTE 0: (*) This bit is a spare bit. It shall be sent as "0". The receiver shall not evaluate this bit.
NOTE 1: 1) This field shall only be evaluated when indicated by the S flag set to 1.
NOTE 2: 2) This field shall only be evaluated when indicated by the PN flag set to 1.
NOTE 3: 3) This field shall only be evaluated when indicated by the E flag set to 1.
NOTE 4: 4) This field shall be present if and only if any one or more of the S, PN and E flags are set.

Fig. 3

| Octets | Bits 8 | 7 | 6 | 5 | 4 | 3 | 2 | 1 |
|---|---|---|---|---|---|---|---|---|
| 1 – m | GTP header ||||||||
| m - n | Information Element(s) ||||||||

GTP Header followed by subsequent Information Elements (IEs)

Fig. 4

Type field for TV and TLV format

Fig. 4A

| Octets | Bits | | | | | | | |
|---|---|---|---|---|---|---|---|---|
| | 8 | 7 | 6 | 5 | 4 | 3 | 2 | 1 |
| 1 | Version | | | P | T | Spare | Spare | Spare |
| 2 | Message Type | | | | | | | |
| 3 | Message Length (1st Octet) | | | | | | | |
| 4 | Message Length (2nd Octet) | | | | | | | |
| m to k(m+3) | If T flag is set to 1, then TEID shall be placed into octets 5-8. Otherwise, TEID field is not present at all. | | | | | | | |
| n to (n+2) | Sequence Number | | | | | | | |
| (n+3) | Spare | | | | | | | |

General format of GTPv2 Header for Control Plane

Fig. 5

| Octets | Bits | | | | | | | |
|---|---|---|---|---|---|---|---|---|
| | 8 | 7 | 6 | 5 | 4 | 3 | 2 | 1 |
| 1 | Version | | | P | T=1 | Spare | Spare | Spare |
| 2 | Message Type | | | | | | | |
| 3 | Message Length (1st Octet) | | | | | | | |
| 4 | Message Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet) | | | | | | | |
| 10 | Sequence Number (2nd Octet) | | | | | | | |
| 11 | Sequence Number (3rd Octet) | | | | | | | |
| 12 | Spare | | | | | | | |

Format of EPC specific GTPv2 Control Plane message Header

Fig. 6

| Octets | Bits | | | | | | | |
|---|---|---|---|---|---|---|---|---|
| | 8 | 7 | 6 | 5 | 4 | 3 | 2 | 1 |
| 1 to m | GTP-C header | | | | | | | |
| m+1 to n | Zero or more Information Element(s) | | | | | | | |

GTP-C Header followed by subsequent Information Elements (IEs)

Fig. 7

GTPv2 Information Element (IE) Format

Fig. 8

GTPv1 IE with new IE Type Extension Field

Fig. 9

GTPv2 IE with new IE Type Extension Field

MECHANISM TO EXTEND IE TYPE IN GTP

This application is a 35 U.S.C. § 371 national phase filing of International Application No. PCT/EP2016/069698, filed Aug. 19, 2016, which claims the benefit of U.S. Provisional Application No. 62/232,517, filed Sep. 25, 2015, the disclosures of which are incorporated herein by reference in their entireties.

TECHNICAL FIELD

This disclosure relates to methods and core network nodes for creating and sending a General Packet Radio Service (GPRS) Tunnelling Protocol (GTP) message comprising a GTP header followed by at least one information element, IE, comprising a plurality of fields.

BACKGROUND

A General Packet Radio Service (GPRS) Tunnelling Protocol (GTP) is a well-known protocol used for setting up GTP tunnels between nodes for separating traffic into different communication flows.

As is well known, in GTP Version 1 (GTPv1), GTP tunnels are e.g. set up over the Gn interface between GPRS Support Nodes (GSNs) such as Serving GPRS Support Nodes (SGSNs) and Gateway GPRS Support Nodes (GGSNs) within a Public Land Mobile Network (PLMN), and over the Gp interface between GSNs in different PLMNs.

In GTP Version2 (GTPv2), which modifies and enhances GTPv1 used in 2G and 3G mobile networks and is commonly referred to as evolved GTP (eGTP) for use in an Evolved Packet Core (EPC) network in a Long-Term Evolution (LTE) system, GTP tunnels are set up between various interface, such as the S5/S8 interface between a Serving Gateway (SGW) and a Packet Data Network Gateway (PGW), the Sn interface between a Mobility Management Entity (MME) and an SGW, the S2b interface between an Evolved Packet Data Gateway (ePDG) and a PGW, etc.

A GTP message consists of a header followed by zero or more information elements (IEs). The header defines, for instance, GTP version, total length of message and tunnel endpoint identifier. In GTPv2, 256 different IE types exist, each IE type being identified by an IE type value from 0 to 255.

The IE type value defines a great variety of message characteristics exemplified e.g. by Mobile Equipment Identity (MEI)—value 75, User Location Information (ULI)—value 86, Bearer Context—value 93, Packet Flow Id—value 123, etc., see for instance technical specification 3GPP TS 29.274 V13.2.0.

Recently, in order to implement new features of the 3rd Generation Partnership Project (3GPP) in the GTPv1 and GTPv2 protocol, a large number of new IE types are specified, leading to less and less (possibly less than 20 in GTPv1 and possibly less than 50 in GTPv2) new IE types left as spare IEs. This may endanger efficient support of more features in the GTPv2 protocol in the future.

SUMMARY

An object of the present disclosure is to solve, or at least mitigate, one or more problems in the art as indicated above, and to provide a method and a core network node for improving the utilization of IEs in GTP messages.

This object is attained in a first aspect of the present disclosure by a method performed in a core network node for creating a GTP message, which GTP message comprises a GTP header followed by at least one IE associated with a special IE type in a set of predefined IE types and which IE comprises a plurality of fields wherein the special IE type is identified by a value encoded in a predefined IE Type Field in a first Octet of the IE. The method comprises reserving an IE Type Extension field in a fourth and fifth octet of the IE or in a fifth and sixth octet of the IE, for enabling a definition of an additional set of new IE types being an extension of the special IE type; and configuring the reserved IE Type Extension field so as to define at least one new IE type in addition to the predefined set of IE types This object is attained in a second aspect of the present disclosure by a core network node configured to operatively create a GTP message, which GTP message comprises a GTP header followed by at least one IE associated with a special IE type in a set of predefined IE types, and which IE comprises a plurality of fields wherein the special IE type is identified by a value encoded in an predefined IE Type Field in a first Octet of the I.E. The core network node comprises a memory with instructions, and a processor configured to operatively execute the instructions to: reserve an IE Type Extension field in a fourth and fifth octet of the IE or in a fifth and sixth octet of the IE for enabling a definition of an additional set of new IE types being an extension of the special IE type; and to configure the reserved IE Type Extension field so as to define at least one new IE type in addition to the predefined set of IE types.

Thus, by reserving one or more of the fields for enabling a definition of an additional set of new IE types being an extension of the special IE type; and configuring the reserved one or more fields so as to define at least one new IE type in addition to the predefined set of IE types, more binary bits for defining further IE types can advantageously be provided.

It is noted that the solution described herein, with reference to exemplifying embodiments, relates to all possible combinations of features recited in the claims. Further features of, and advantages with, the present solution will become apparent when studying the appended claims and the following description. Those skilled in the art realize that different features of the present solution can be combined to create embodiments other than those described in the following.

BRIEF DESCRIPTION OF THE DRAWINGS

The foregoing will be apparent from the following more particular description of the exemplifying embodiments, as illustrated in the accompanying drawings in which like reference characters refer to the same parts throughout the different views.

DETAILED DESCRIPTION

In the following description, for purposes of explanation and not limitation, specific details are set forth, such as particular components, elements, techniques, etc. in order to provide a thorough understanding of the exemplifying embodiments. However, it will be apparent to one skilled in the art that the exemplifying embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
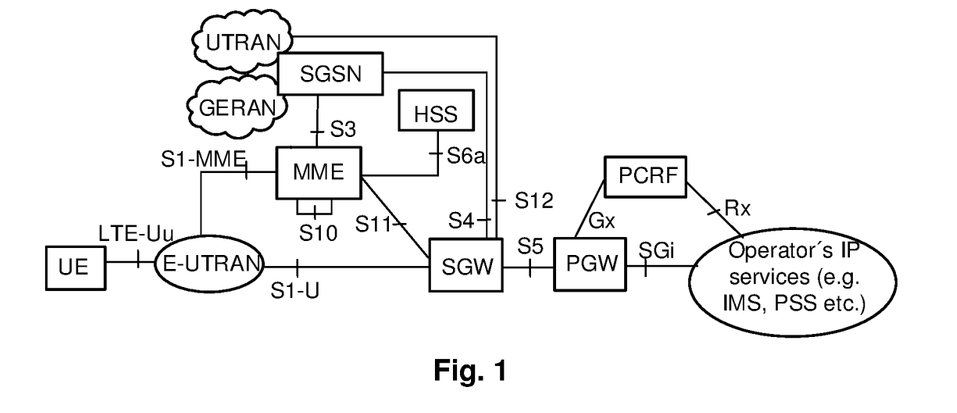
FIG. 1 shows a schematic illustration of an exemplifying and well-known LTE architecture for 3GPP accesses within an Evolved Packet System (EPS)

FIG. 1 sows a schematic illustration of a well-known exemplifying wireless communication system. The system is a so called LTE-based system. It should be emphasized that the terms "LTE" and "LTE-based" system is used herein to comprise both present and future LTE based systems, such as, for example, advanced LTE systems. Further, it should be appreciated that although FIG. 1 shows a wireless communication system in the form of a LTE-based system, the example embodiments herein may also be utilized in connection with other wireless communication systems comprising nodes and functions that correspond to the nodes and functions of the system in FIG. 1.

Figure 2:
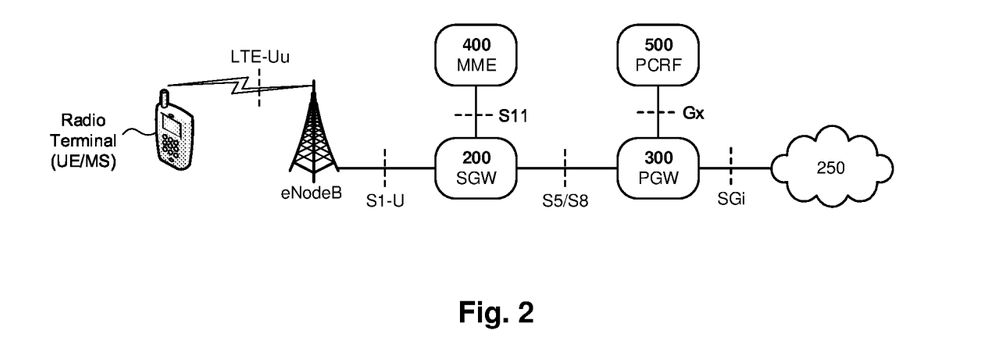
FIG. 2 shows another schematic illustration of a well-known exemplifying LTE architecture.

FIG. 2 shows another schematic illustration of a well-known wireless communication system in the form of an exemplifying LTE-based architecture. As can be seen in FIG. 2, the system comprises a base station in the form of an eNodeB, connected to a Serving Gateway (SGW), in turn connected to a Mobility Management Entity (MME) and a PDN Gateway (PGW), which in turn is connected to a Policy and Charging Rules Function (PCRF).

The eNodeB is a radio access node that interfaces with a radio terminal, which is denoted User Equipment (UE) in LTE. In fact, the eNodeBs of the system forms the radio access network E-UTRAN for LTE.

The SGW 200 routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The MME 400 is a key control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management.

Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs The PGW 300 provides connectivity to the UE to external packet data networks 250 by being the point of exit and entry of traffic for the UE. A UE may have simultaneous connectivity with more than one PGW for accessing multiple PDNs. Typically, the PGW performs one or more of; policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1× and EvDO).

The PCRF 500 determines policy rules in real-time with respect to the radio terminals of the system. This may e.g. include aggregating information in real-time to and from the core network and operational support systems etc of the system so as to support the creation of rules and/or automatically making policy decisions for user radio terminals currently active in the system based on such rules or similar. The PCRF provides the PGW with such rules and/or policies or similar to be used by the acting as a Policy and Charging Enforcement Function (PCEF).

The SGW, MME, PGW and the PCRF are all examples of core network nodes, while the eNodeB is an example of a radio access network (RAN) node. The core network nodes communicate with each other by means of GTP messages.

As already indicated above in the Background section, it is well known that the GTPv1 and GTPv2 are used to set up GTP tunnels and to communicate various GTP messages between core network nodes in a core network.

Generally, a GTP message consists of a header followed by zero or more information elements (IEs).

Below the GTPv1 header and the GTPV1 IEs in a GTPv1 message, as well as the GTPv2 header and the GTPv2 IEs in a GTPv2 message will be described in some detail.

The GTPv1 Header

The GTPv1 header in a GTPv1 message is a variable length header used for both the GTP-C and the GTP-U protocols, i.e. for GTP control plane and GTP user plane protocols.

Figure 3:
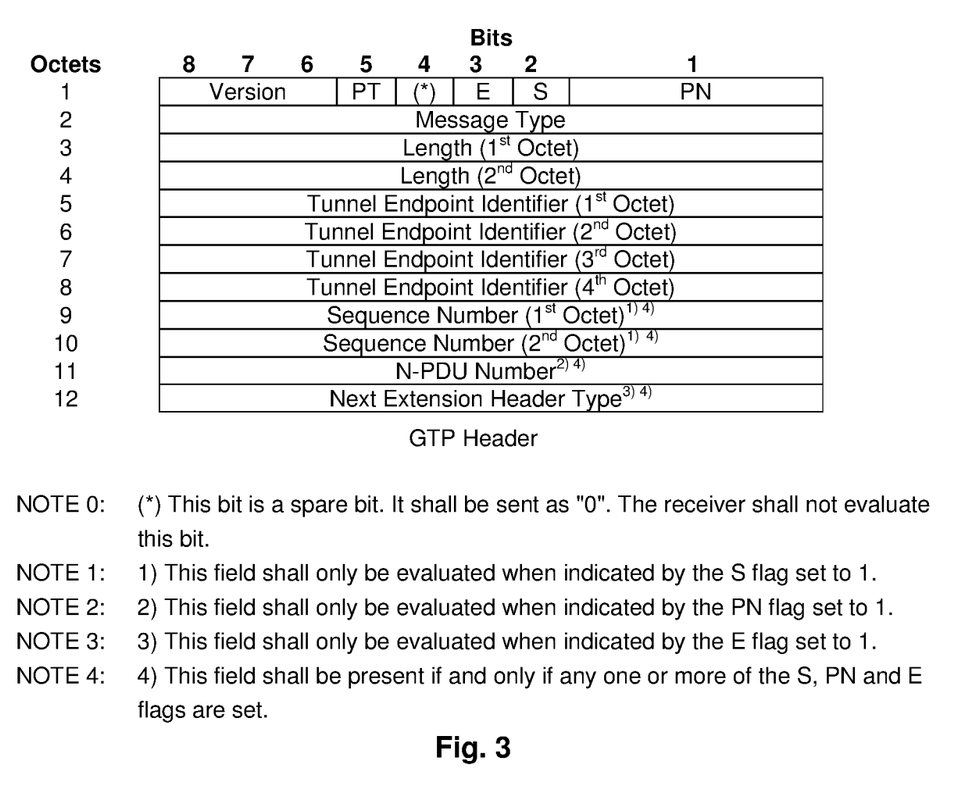
FIG. 3 shows a schematic illustration of a GTPv1 header.

As can be seen in FIG. 3, there are three flags in a GTPv1 header that are used to signal the presence of additional optional fields: the PN flag, the S flag and the E flag. The PN flag is used to signal the presence of N-PDU Numbers. The S flag is used to signal the presence of the GTP Sequence Number field. The E flag is used to signal the presence of the Extension Header field, used to enable future extensions of the GTP header. If and only if one or more of these three flags are set, the fields Sequence Number, N-PDU and Extension Header shall be present. In a well-known manner there are also a number of Tunnel Endpoint Identifiers (TEIDs) present in the GTPv1 header.

The GTP-C (control plane) and the GTP-U (user plane) use some of the fields in the GTP header differently.

The GTPv1-C Header and Information Elements (IEs)

Figure 4:
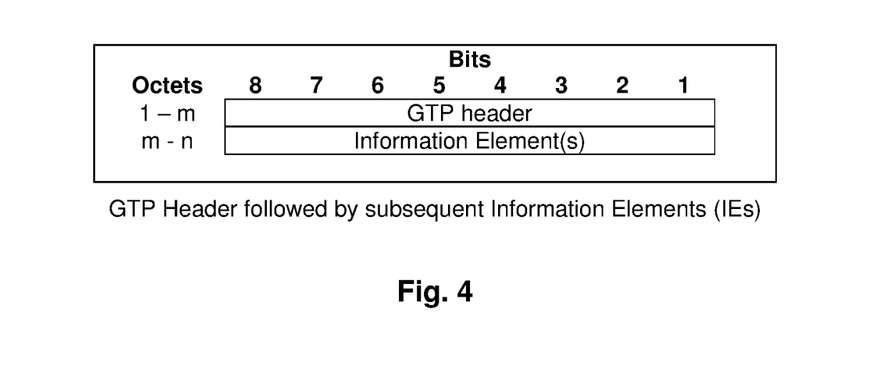
FIG. 4 shows a schematic illustration of a GTPv1 header followed by one or more subsequent IEs.
Figure 4A:
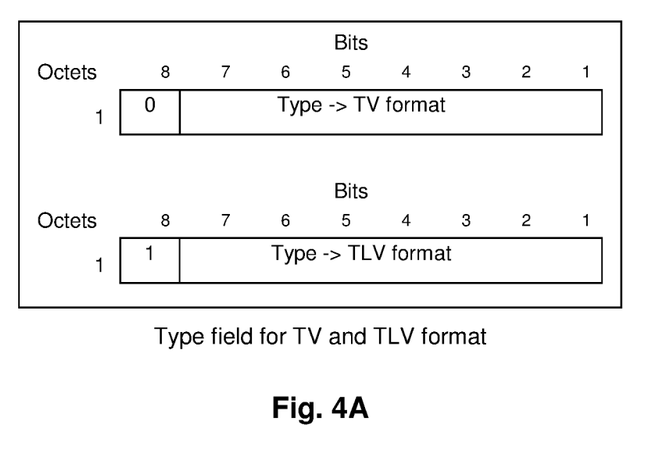
FIG. 4A shows type field for TV and TLV format.

As can be seen in FIG. 4, the GTP-C header may be followed by one or more subsequent IEs, depending on the type of control plane message. Only one IE of each type is allowed in a single GTPv1-C message, except for the Authentication Triplet, the PDP Context, the Tunnel Endpoint Identifier Data II, NSAPI, PS Handover XID Parameters, Packet Flow ID, RFSP Index, PDU Numbers, Evolved Allocation/Retention Priority II, APN-AMBR with NSAPI, Signalling Priority Indication with NSAPI, Local Home Network ID (LHN-ID) with NSAPI, Charging Characteristics and the FQDN information element where several occurrences of each type are allowed.

GTPv1 Information Elements (IEs)

A GTP (signalling) message may contain several IEs. It is preferred that the IEs are sorted, with the Type fields in ascending order, in the GTP signalling messages. Within IEs, certain fields may be described as spare. To allow for future features, the receiver shall not evaluate these bits. However, according to embodiments of the present solution, some such fields may be used.

The table below shows the currently available GTPv1 Information Elements (IEs). In the table the Length Type may be Fixed, Variable, or Extendable.

These are defined as follows:

Information elements with Length Type of Fixed have a fixed set of fields and a fixed number of octets. They have the number of the last octet with a fixed value, e.g., "4".

Information elements with Length Type of Variable have a fixed set of fields and a variable number of octets. They have the number of the last octet with a variable value, e.g., "n". Variable length information elements shall never have any new octet fields added beyond the last variable octet.

Information elements with Length Type of Extendable have a variable number of fields and a variable number of octets. They have the number of the last octet with a variable value, e.g., "n" and also have the following description: "These octet(s) is/are present only if explicitly specified". TV format information elements shall always have Length Type of Fixed. TLV format information elements may have Length Type Fixed, Variable or Extendable.

GTPv1 Information Elements (IEs)

| IE Type Value | Format | Information Element | Reference | Length Type | Number of Fixed Octets |
|---|---|---|---|---|---|
| 0 | TV | Reserved. | | | |
| 1 | TV | Cause | 7.7.1 | Fixed | 1 |
| 2 | TV | International Mobile Subscriber Identity (IMSI) | 7.7.2 | Fixed | 8 |
| 3 | TV | Routeing Area Identity (RAI) | 7.7.3 | Fixed | 6 |
| 4 | TV | Temporary Logical Link Identity (TLLI) | 7.7.4 | Fixed | 4 |
| 5 | TV | Packet TMSI (P-TMSI) | 7.7.5 | Fixed | 4 |
| 6-7 | | | | Spare | |
| 8 | TV | Reordering Required | 7.7.6 | Fixed | 1 |
| 9 | TV | Authentication Triplet | 7.7.7 | Fixed | 28 |
| 10 | | | | Spare | |
| 11 | TV | MAP Cause | 7.7.8 | Fixed | 1 |
| 12 | TV | P-TMSI Signature | 7.7.9 | Fixed | 3 |
| 13 | TV | MS Validated | 7.7.10 | Fixed | 1 |
| 14 | TV | Recovery | 7.7.11 | Fixed | 1 |
| 15 | TV | Selection Mode | 7.7.12 | Fixed | 1 |
| 16 | TV | Tunnel Endpoint Identifier Data I | 7.7.13 | Fixed | 4 |
| 17 | TV | Tunnel Endpoint Identifier Control Plane | 7.7.14 | Fixed | 4 |
| 18 | TV | Tunnel Endpoint Identifier Data II | 7.7.15 | Fixed | 5 |
| 19 | TV | Teardown Ind | 7.7.16 | Fixed | 1 |
| 20 | TV | NSAPI | 7.7.17 | Fixed | 1 |
| 21 | TV | RANAP Cause | 7.7.18 | Fixed | 1 |
| 22 | TV | RAB Context | 7.7.19 | Fixed | 9 |
| 23 | TV | Radio Priority SMS | 7.7.20 | Fixed | 1 |
| 24 | TV | Radio Priority | 7.7.21 | Fixed | 1 |
| 25 | TV | Packet Flow Id | 7.7.22 | Fixed | 2 |
| 26 | TV | Charging Characteristics | 7.7.23 | Fixed | 2 |
| 27 | TV | Trace Reference | 7.7.24 | Fixed | 2 |
| 28 | TV | Trace Type | 7.7.25 | Fixed | 2 |
| 29 | TV | MS Not Reachable Reason | 7.7.25A | Fixed | 1 |
| 30-116 | TV | Reserved. (No TV types can now be allocated) | | | |
| 117-126 | | Reserved for the GPRS charging protocol (see GTP' in 3GPP TS 32.295 [33]) | | | |
| 127 | TV | Charging ID | 7.7.26 | Fixed | 4 |

-continued

GTPv1 Information Elements (IEs)

| IE Type Value | Format | Information Element | Reference | Length Type | Number of Fixed Octets |
|---|---|---|---|---|---|
| 128 | TLV | End User Address | 7.7.27 | Variable | Not Applicable |
| 129 | TLV | MM Context | 7.7.28 | Variable | Not Applicable |
| 130 | TLV | PDP Context | 7.7.29 | Variable | Not Applicable |
| 131 | TLV | Access Point Name | 7.7.30 | Variable | Not Applicable |
| 132 | TLV | Protocol Configuration Options | 7.7.31 | Variable | Not Applicable |
| 133 | TLV | GSN Address | 7.7.32 | Variable | Not Applicable |
| 134 | TLV | MS International PSTN/ISDN Number (MSISDN) | 7.7.33 | Variable | Not Applicable |
| 135 | TLV | Quality of Service Profile | 7.7.34 | Variable | Not Applicable |
| 136 | TLV | Authentication Quintuplet | 7.7.35 | Variable | Not Applicable |
| 137 | TLV | Traffic Flow Template | 7.7.36 | Variable | Not Applicable |
| 138 | TLV | Target Identification | 7.7.37 | Variable | Not Applicable |
| 139 | TLV | UTRAN Transparent Container | 7.7.38 | Variable | Not Applicable |
| 140 | TLV | RAB Setup Information | 7.7.39 | Variable | Not Applicable |
| 141 | TLV | Extension Header Type List | 7.7.40 | Variable | Not Applicable |
| 142 | TLV | Trigger Id | 7.7.41 | Variable | Not Applicable |
| 143 | TLV | OMC Identity | 7.7.42 | Variable | |
| 144 | TLV | RAN Transparent Container | 7.7.43 | Variable | Not Applicable |
| 145 | TLV | PDP Context Prioritization | 7.7.45 | Fixed | 0 |
| 146 | TLV | Additional RAB Setup Information | 7.7.45A | Variable | Not Applicable |
| 147 | TLV | SGSN Number | 7.7.47 | Variable | Not Applicable |
| 148 | TLV | Common Flags | 7.7.48 | Fixed | 1 |
| 149 | TLV | APN Restriction | 7.7.49 | Fixed | 1 |
| 150 | TLV | Radio Priority LCS | 7.7.25B | Fixed | 1 |
| 151 | TLV | RAT Type | 7.7.50 | Fixed | 1 |
| 152 | TLV | User Location Information | 7.7.51 | Variable | Not Applicable |
| 153 | TLV | MS Time Zone | 7.7.52 | Fixed | 1 |
| 154 | TLV | IMEI (SV) | 7.7.53 | Fixed | 8 |
| 155 | TLV | CAMEL Charging Information Container | 7.7.54 | Variable | Not Applicable |
| 156 | TLV | MBMS UE Context | 7.7.55 | Variable | Not Applicable |
| 157 | TLV | Temporary Mobile Group Identity (TMGI) | 7.7.56 | Fixed | 6 |
| 158 | TLV | RIM Routing Address | 7.7.57 | Variable | Not Applicable |
| 159 | TLV | MBMS Protocol Configuration Options | 7.7.58 | Variable | Not Applicable |
| 160 | TLV | MBMS Service Area | 7.7.60 | Variable | Not Applicable |
| 161 | TLV | Source RNC PDCP context info | 7.7.61 | Variable | Not Applicable |
| 162 | TLV | Additional Trace Info | 7.7.62 | Fixed | 9 |
| 163 | TLV | Hop Counter | 7.7.63 | Fixed | 1 |
| 164 | TLV | Selected PLMN ID | 7.7.64 | Fixed | 3 |
| 165 | TLV | MBMS Session Identifier | 7.7.65 | Fixed | 1 |
| 166 | TLV | MBMS 2G/3G Indicator | 7.7.66 | Fixed | 1 |
| 167 | TLV | Enhanced NSAPI | 7.7.67 | Fixed | 1 |
| 168 | TLV | MBMS Session Duration | 7.7.59 | Fixed | 3 |
| 169 | TLV | Additional MBMS Trace Info | 7.7.68 | Fixed | 8 |
| 170 | TLV | MBMS Session Repetition Number | 7.7.69 | Fixed | 1 |
| 171 | TLV | MBMS Time To Data Transfer | 7.7.70 | Fixed | 1 |

-continued

GTPv1 Information Elements (IEs)

| IE Type Value | Format | Information Element | Reference | Length Type | Number of Fixed Octets |
|---|---|---|---|---|---|
| 172 | | Reserved (NOTE 1) | | | |
| 173 | TLV | BSS Container | 7.7.72 | Variable | Not Applicable |
| 174 | TLV | Cell Identification | 7.7.73 | Fixed | 17 |
| 175 | TLV | PDU Numbers | 7.7.74 | Fixed | 9 |
| 176 | TLV | BSSGP Cause | 7.7.75 | Fixed | 1 |
| 177 | TLV | Required MBMS bearer capabilities | 7.7.76 | Variable | Not Applicable |
| 178 | TLV | RIM Routing Address Discriminator | 7.7.77 | Fixed | 1 |
| 179 | TLV | List of set-up PFCs | 7.7.78 | Variable | Not Applicable |
| 180 | TLV | PS Handover XID Parameters | 7.7.79 | Variable | Not Applicable |
| 181 | TLV | MS Info Change Reporting Action | 7.7.80 | Fixed | 1 |
| 182 | TLV | Direct Tunnel Flags | 7.7.81 | Variable | Not Applicable |
| 183 | TLV | Correlation-ID | 7.7.82 | Fixed | 1 |
| 184 | TLV | Bearer Control Mode | 7.7.83 | Fixed | 1 |
| 185 | TLV | MBMS Flow Identifier | 7.7.84 | Variable | Not Applicable |
| 186 | TLV | MBMS IP Multicast Distribution | 7.7.85 | Variable | Not Applicable |
| 187 | TLV | MBMS Distribution Acknowledgement | 7.7.86 | Fixed | 1 |
| 188 | TLV | Reliable INTER RAT HANDOVER INFO | 7.7.87 | Fixed | 1 |
| 189 | TLV | RFSP Index | 7.7.88 | Fixed | 2 |
| 190 | TLV | Fully Qualified Domain Name (FQDN) | 7.7.90 | Variable | Not Applicable |
| 191 | TLV | Evolved Allocation/Retention Priority I | 7.7.91 | Fixed | 1 |
| 192 | TLV | Evolved Allocation/Retention Priority II | 7.7.92 | Fixed | 2 |
| 193 | TLV | Extended Common Flags | 7.7.93 | Variable | Not Applicable |
| 194 | TLV | User CSG Information (UCI) | 7.7.94 | Fixed | 8 |
| 195 | TLV | CSG Information Reporting Action | 7.7.95 | Variable | Not Applicable |
| 196 | TLV | CSG ID | 7.7.96 | Fixed | 4 |
| 197 | TLV | CSG Membership Indication (CMI) | 7.7.97 | Fixed | 1 |
| 198 | TLV | Aggregate Maximum Bit Rate (AMBR) | 7.7.98 | Fixed | 8 |
| 199 | TLV | UE Network Capability | 7.7.99 | Variable | Not Applicable |
| 200 | TLV | UE-AMBR | 7.7.100 | Variable | Not Applicable |
| 201 | TLV | APN-AMBR with NSAPI | 7.7.101 | Fixed | 9 |
| 202 | TLV | GGSN Back-Off Time | 7.7.102 | Extendable | 1 |
| 203 | TLV | Signalling Priority Indication | 7.7.103 | Extendable | 1 |
| 204 | TLV | Signalling Priority Indication with NSAPI | 7.7.104 | Extendable | 2 |
| 205 | TLV | Higher bitrates than 16 Mbps flag | 7.7.105 | Fixed | 1 |
| 206 | | Reserved (NOTE 1) | | | |
| 207 | TLV | Additional MM context for SRVCC | 7.7.107 | Extendable | "e-3" (See FIG. 7.7.107-1) |
| 208 | TLV | Additional flags for SRVCC | 7.7.108 | Extendable | 1 |
| 209 | TLV | STN-SR | 7.7.109 | Variable | Not Applicable |
| 210 | TLV | C-MSISDN | 7.7.110 | Variable | Not Applicable |
| 211 | TLV | Extended RANAP Cause | 7.7.111 | Extendable | 2 |
| 212 | TLV | eNodeB ID | 7.7.112 | Variable | Not Applicable |

-continued

| | | GTPv1 Information Elements (IEs) | | | |
|---|---|---|---|---|---|
| IE Type Value | Format | Information Element | Reference | Length Type | Number of Fixed Octets |
| 213 | TLV | Selection Mode with NSAPI | 7.7.113 | Fixed | 2 |
| 214 | TLV | ULI Timestamp | 7.7.114 | Extendable | 4 |
| 215 | TLV | Local Home Network ID (LHN-ID) with NSAPI | 7.7.115 | Variable | Not Applicable |
| 216 | TLV | CN Operator Selection Entity | 7.7.116 | Extendable | 1 |
| 217-238 | TLV | Spare. For future use. | | | |
| 239-250 | | Reserved for the GPRS charging protocol (see GTP' in 3GPP TS 32.295 [33]) | | | |
| 251 | TLV | Charging Gateway Address | 7.7.44 | | 4/16 |
| 252-254 | | Reserved for the GPRS charging protocol (see GTP' in 3GPP TS 32.295 [33]) | | | |
| 255 | TLV | Private Extension | 7.7.46 | | Not Applicable |

NOTE 1:
This value was allocated in an earlier version of the specification.

NOTE 2:
The size of the TL (Type and Length) fields, i.e "3" octets, is subtracted from the number of the fixed octets of the Fixed Length and Extendable type of the IEs. Hence for some of the Extendable IEs, for which the length is defined in terms of variable number of octets, "3" is explicitly subtracted while defining the fixed number of octets. E.g. length of Additional MM Context for SRVCC is defined as "e" and fixed number of octets for the same is defined as "e-3".

It should be added that the most significant bit in the TV and TLV Type field is set to 0 when the TV format is used for an IE, and set to 1 for the TLV format.

GTP v2 Header for Control Plane

Figure 5:
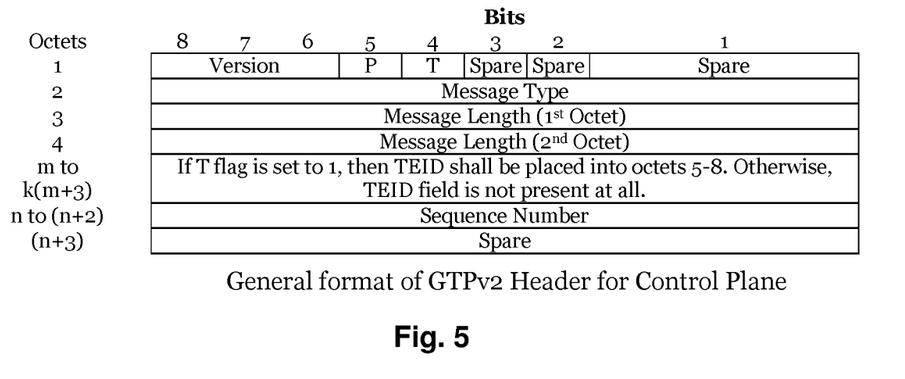
FIG. 5 shows a schematic illustration of a GTPv2-C header.

FIG. 5 illustrates the general format of a Control Plane GTPv2 Header (GTPv2-C Header) in a GTPv2-C message. GTPv2-C uses a variable length header. Control Plane GTP header length shall be a multiple of 4 octets. The usage of GTPv2-C header across the EPC specific interfaces is defined in the 3GPP TS 29274 subclause 5.5 "Usage of the GTPv2-C Header".

In the GTPv2-C header:
if T=0, TEID field is not present, k=0, m=0 and n=5;
if T=1, TEID field is present, k=1, m=5 and n=9.
The octet 1 bits shall be coded as follows:
Bits 6-8 represent the Version field.
Bit 5 represents the Piggybacking flag (P).
Bit 4 represents the TEID flag (T).
Bits 3-1 are spare, the sender shall set them to "o" and the receiving entity shall ignore them.

Figure 6:
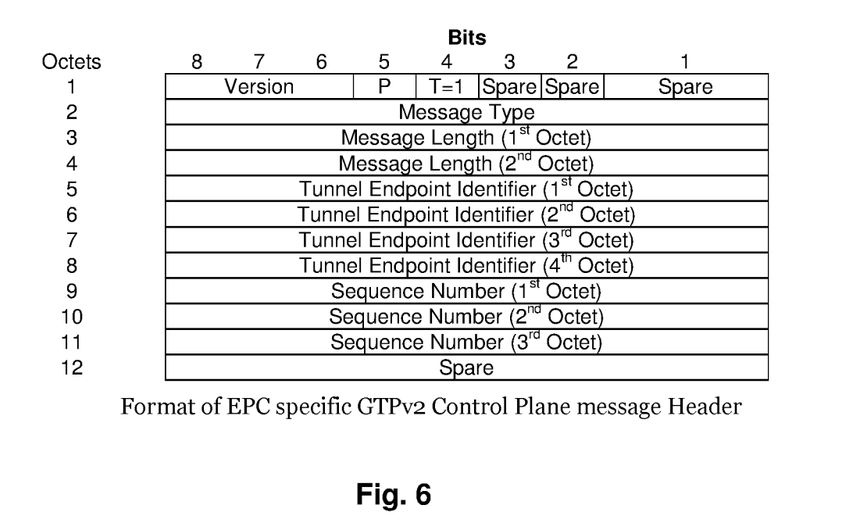
FIG. 6 shows a schematic illustration of an EPC specific GTPv2-C header.

FIG. 6 shows a schematic illustration of an EPC specific GTP-C header. It may be noted that apart from the Echo Request, Echo Response and Version Not Supported Indication messages, the GTP-C message header shall contain the TEID and Sequence Number fields followed by one spare octet. The spare bits shall be set to zero by the sender and ignored by the receiver.

Figure 7:
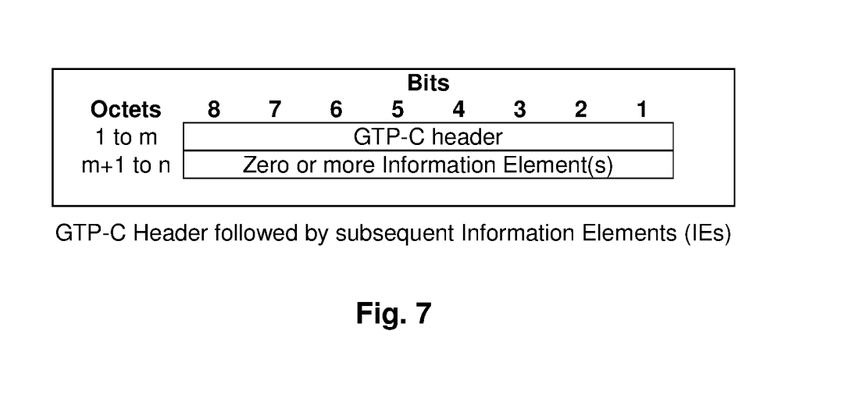
FIG. 7 shows a schematic illustration of a GTPv2-C header followed by zero, or one (i) or more subsequent IEs.

FIG. 7 shows a schematic illustration of a GTPv2-C header followed by zero, or one (1) or more subsequent IEs, depending on the type of control plane message.

GTPv2-C Information Elements (IEs)

A GTPv2 control plane (signalling) message may contain several IEs. In order to have forward compatible type definitions for the GTPv2 IEs, all of them shall be TLIV (Type, Length, Instance, Value) coded.

The table below shows the currently available GTPv2 Information Elements (IEs). The last column of this table indicates whether the information element is:
Fixed Length: the IE has a fixed set of fields, and a fixed number of octets.
Variable Length: the IE has a fixed set of fields, and has a variable number of octets. For example, the last octets may be numbered similar to "5 to (n+4)". In this example, if the value of the length field, n, is 0, then the last field is not present.
Extendable: the IE has a variable number of fields, and has a variable number of octets. The last fields are typically specified with the statement: "These octet(s) is/are present only if explicitly specified". The legacy receiving entity shall ignore the unknown octets.

| | Information Element types for GTPv2 | | |
|---|---|---|---|
| IE Type value (Decimal) | Information elements | Comment/Reference | Number of Fixed Octets |
| 0 | Reserved | | |
| 1 | International Mobile Subscriber Identity (IMSI) | Variable Length/8.3 | Not Applicable |
| 2 | Cause | Variable Length/8.4 | Not Applicable |
| 3 | Recovery (Restart Counter) | Variable Length/8.5 | Not Applicable |
| 4 to 34 | Reserved for S101 interface | See 3GPP TS 29.276 [14] | See 3GPP TS 29.276 [14] |
| 35 to 50 | Reserved for S121 interface | See 3GPP TS 29.276 [14] | See 3GPP TS 29.276 [14] |
| 51 | STN-SR | See 3GPP TS 29.280 [15] | See 3GPP TS 29.280 [15] |
| 52 to 70 | Reserved for Sv interface | See 3GPP TS 29.280 [15] | See 3GPP TS 29.280 [15] |
| 71 | Access Point Name (APN) | Variable Length/8.6 | Not Applicable |
| 72 | Aggregate Maximum Bit Rate (AMBR) | Fixed Length/8.7 | 8 |

Information Element types for GTPv2

| IE Type value (Decimal) | Information elements | Comment/Reference | Number of Fixed Octets |
|---|---|---|---|
| 73 | EPS Bearer ID (EBI) | Extendable/8.8 | 1 |
| 74 | IP Address | Variable Length/8.9 | Not Applicable |
| 75 | Mobile Equipment Identity (MEI) | Variable Length/8.10 | Not Applicable |
| 76 | MSISDN | Variable Length/8.11 | Not Applicable |
| 77 | Indication | Extendable/8.12 | 2 |
| 78 | Protocol Configuration Options (PCO) | Variable Length/8.13 | Not Applicable |
| 79 | PDN Address Allocation (PAA) | Variable Length/8.14 | Not Applicable |
| 80 | Bearer Level Quality of Service (Bearer QoS) | Extendable/8.15 | 22 |
| 81 | Flow Quality of Service (Flow QoS) | Extendable/8.16 | 21 |
| 82 | RAT Type | Extendable/8.17 | 1 |
| 83 | Serving Network | Extendable/8.18 | 3 |
| 84 | EPS Bearer Level Traffic Flow Template (Bearer TFT) | Variable Length/8.19 | Not Applicable |
| 85 | Traffic Aggregation Description (TAD) | Variable Length/8.20 | Not Applicable |
| 86 | User Location Information (ULI) | Extendable/8.21 | "f + 4-4" (See FIG. 8.21-1) |
| 87 | Fully Qualified Tunnel Endpoint Identifier (F-TEID) | Extendable/8.22 | 9/21/25 |
| 88 | TMSI | Variable Length/8.23 | Not Applicable |
| 89 | Global CN-Id | Variable Length/8.24 | Not Applicable |
| 90 | S103 PDN Data Forwarding Info (S103PDF) | Variable Length/8.25 | Not Applicable |
| 91 | S1-U Data Forwarding Info (S1UDF) | Variable Length/8.26 | Not Applicable |
| 92 | Delay Value | Extendable/8.27 | 1 |
| 93 | Bearer Context | Extendable/8.28 | Not Applicable |
| 94 | Charging ID | Extendable/8.29 | 4 |
| 95 | Charging Characteristics | Extendable/8.30 | 2 |
| 96 | Trace Information | Variable Length/8.31 | Not Applicable |
| 97 | Bearer Flags | Extendable/8.32 | 1 |
| 98 | Reserved | | |
| 99 | PDN Type | Extendable/8.34 | 1 |
| 100 | Procedure Transaction ID | Extendable/8.35 | 1 |
| 101 | Reserved | | |
| 102 | Reserved | | |
| 103 | MM Context (GSM Key and Triplets) | Extendable/8.38 | "r + 1-4" (See FIG. 8.38-1) |
| 104 | MM Context (UMTS Key, Used Cipher and Quintuplets) | Extendable/8.38 | "r + 1-4" (See FIG. 8.38-2) |
| 105 | MM Context (GSM Key, Used Cipher and Quintuplets) | Extendable/8.38 | "r + 1-4" (See FIG. 8.38-3) |
| 106 | MM Context (UMTS Key and Quintuplets) | Extendable/8.38 | "r + 1-4" (See FIG. 8.38-4) |
| 107 | MM Context (EPS Security Context, Quadruplets and Quintuplets) | Extendable/8.38 | "s + 64-4" (See FIG. 8.38-5) |
| 108 | MM Context (UMTS Key, Quadruplets and Quintuplets) | Extendable/8.38 | "r + 1-4" (See FIG. 8.38-6) |
| 109 | PDN Connection | Extendable/8.39 | Not Applicable |
| 110 | PDU Numbers | Extendable/8.40 | 9 |
| 111 | P-TMSI | Variable Length/8.41 | Not Applicable |
| 112 | P-TMSI Signature | Variable Length/8.42 | Not Applicable |
| 113 | Hop Counter | Extendable/8.43 | 1 |
| 114 | UE Time Zone | Extendable/8.44 | 2 |
| 115 | Trace Reference | Fixed Length/8.45 | 6 |
| 116 | Complete Request Message | Variable Length/8.46 | Not Applicable |
| 117 | GUTI | Variable Length/8.47 | Not Applicable |
| 118 | F-Container | Variable Length/8.48 | Not Applicable |
| 119 | F-Cause | Variable Length/8.49 | Not Applicable |
| 120 | PLMN ID | Variable Length/8.50 | Not Applicable |
| 121 | Target Identification | Variable Length/8.51 | Not Applicable |
| 122 | Reserved | | |
| 123 | Packet Flow ID | Variable Length/8.53 | Not Applicable |
| 124 | RAB Context | Fixed Length/8.54 | 9 |
| 125 | Source RNC PDCP Context Info | Variable Length/8.55 | Not Applicable |
| 126 | UDP Source Port Number | Extendable/8.56 | 2 |
| 127 | APN Restriction | Extendable/8.57 | 1 |
| 128 | Selection Mode | Extendable/8.58 | 1 |
| 129 | Source Identification | Variable Length/8.59 | Not Applicable |
| 130 | Reserved | | |
| 131 | Change Reporting Action | Variable Length/8.61 | Not Applicable |
| 132 | Fully Qualified PDN Connection Set Identifier (FQ-CSID) | Extendable/8.62 | "q + 1-4" (See FIG. 8.62-1) |
| 133 | Channel needed | Variable Length/8.63 | Not Applicable |
| 134 | eMLPP Priority | Variable Length/8.64 | Not Applicable |
| 135 | Node Type | Extendable/8.65 | 1 |

Information Element types for GTPv2

Figure 8:
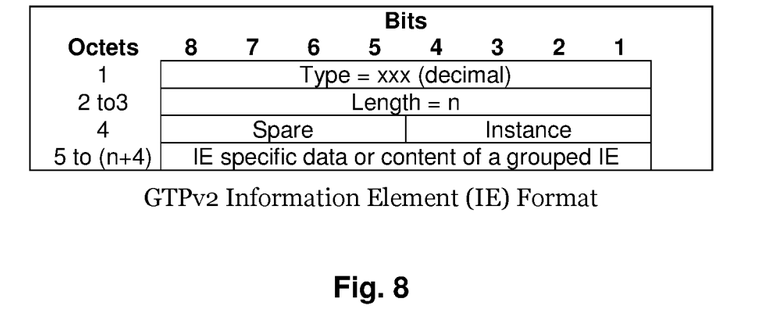
FIG. 8 is a schematic illustration of the format of an exemplifying GTPv2 Information Element (IE)

| IE Type value (Decimal) | Information elements | Comment/Reference | Number of Fixed Octets |
|---|---|---|---|
| 136 | Fully Qualified Domain Name (FQDN) | Variable Length/8.66 | Not Applicable |
| 137 | Transaction Identifier (TI) | Variable Length/8.68 | Not Applicable |
| 138 | MBMS Session Duration | Extendable/8.69 | 3 |
| 139 | MBMS Service Area | Variable Length/8.70 | Not Applicable |
| 140 | MBMS Session Identifier | Extendable/8.71 | 1 |
| 141 | MBMS Flow Identifier | Extendable/8.72 | 2 |
| 142 | MBMS IP Multicast Distribution | Extendable/8.73 | "m + 1-4" (See FIG. 8.73-1) |
| 143 | MBMS Distribution Acknowledge | Extendable/8.74 | 1 |
| 144 | RFSP Index | Fixed Length/8.77 | 2 |
| 145 | User CSG Information (UCI) | Extendable/8.75 | 8 |
| 146 | CSG Information Reporting Action | Extendable/8.76 | 1 |
| 147 | CSG ID | Extendable/8.78 | 4 |
| 148 | CSG Membership Indication (CMI) | Extendable/8.79 | 1 |
| 149 | Service indicator | Fixed Length/8.80 | 1 |
| 150 | Detach Type | Fixed Length/8.81 | 1 |
| 151 | Local Distiguished Name (LDN) | Variable Length/8.82 | Not Applicable |
| 152 | Node Features | Extendable/8.83 | 1 |
| 153 | MBMS Time to Data Transfer | Extendable/8.84 | 1 |
| 154 | Throttling | Extendable/8.85 | 2 |
| 155 | Allocation/Retention Priority (ARP) | Extendable/8.86 | 1 |
| 156 | EPC Timer | Extendable/8.87 | 1 |
| 157 | Signalling Priority Indication | Extendable/8.88 | 1 |
| 158 | Temporary Mobile Group Identity (TMGI) | Extendable/8.89 | 6 |
| 159 | Additional MM context for SRVCC | Extendable/8.90 | "e-4" (See FIG. 8.90-1) |
| 160 | Additional flags for SRVCC | Extendable/8.91 | 1 |
| 161 | Reserved | | |
| 162 | MDT Configuration | Extendable/8.93 | "q-4" (See FIG. 8.93-1) |
| 163 | Additional Protocol Configuration Options (APCO) | Extendable/8.94 | "m-4" (See FIG. 8.94-1) |
| 164 | Absolute Time of MBMS Data Transfer | Extendable/8.95 | 8 |
| 165 | H(e)NB Information Reporting | Extendable/8.96 | 1 |
| 166 | IPv4 Configuration Parameters (IP4CP) | Extendable/8.97 | 5 |
| 167 | Change to Report Flags | Extendable/8.98 | 1 |
| 168 | Action Indication | Extendable/8.99 | 1 |
| 169 | TWAN Identifier | Extendable/8.100 | "k + 6-4" (See FIG. 8.100-1) |
| 170 | ULI Timestamp | Extendable/8.101 | 4 |
| 171 | MBMS Flags | Extendable/8.102 | 1 |
| 172 | RAN/NAS Cause | Extendable/8.103 | "m-4" (See FIG. 8.103-1) |
| 173 | CN Operator Selection Entity | Extendable/8.104 | 1 |
| 174 | Trusted WLAN Mode Indication | Extendable/8.105 | 1 |
| 175 | Node Number | Extendable/8.106 | "p-4" (See FIG. 8.106-1) |
| 176 | Node Identifier | Extendable/8.107 | "q-4" (See FIG. 8.107-1) |
| 177 | Presence Reporting Area Action | Extendable/8.108 | "t-4" (See FIG. 8.108-1) |
| 178 | Presence Reporting Area Information | Extendable/8.109 | 4 |
| 179 | TWAN Identifier Timestamp | Extendable/8.110 | 4 |
| 180 | Overload Control Information | Extendable/8.111 | Not Applicable |
| 181 | Load Control Information | Extendable/8.112 | Not Applicable |
| 182 | Metric | Fixed Length/8.113 | 1 |
| 183 | Sequence Number | Fixed Length/8.114 | 4 |
| 184 | APN and Relative Capacity | Extendable/8.115 | "m-4" (See FIG. 8.115 |
| 185 | WLAN Offloadability Indication | Extendable/8.116 | 1 |
| 186 | Paging and Service Information | Extendable/8.117 | m-4 (See FIG. 8.117-1) |
| 187 to 254 | Spare. For future use. | | |
| 255 | Private Extension | Variable Length/8.67 | Not Applicable |

NOTE 1:
The size of the TLI (Type, Length and Instance) fields, i.e "4" octets, has been subtracted from the number of the fixed octets of the "Fixed Length" and "Extendable" IEs. Hence for some of the "Extendable" IEs, for which the length is defined in terms of variable number of octets, "4" is explicitly subtracted while defining the fixed number of octets. E.g. Length of User Location Information is defined as "f + 4" and fixed number of octets for the same is defined as "f + 4-4".

FIG. 8 shows the format of an exemplifying GTPv2 Information Element (IE). Typically, an IE has the following fields:

Type field: This field indicates the type of Information Element. The valid values of the currently available GTPv2-C IE types are defined the above table.

Length: This field contains the length of the information element excluding the first four octets, which are common for all information elements (Type, Length and the contents of octet 4) and is denoted "n" in FIGS. 8.2-1. For all the length fields, bit 8 of the lowest numbered octet is the most significant bit and bit 1 of the highest numbered octet is the least significant bit.

The IE may also have the Instance field: This field shall be used to differentiate amongst different parameters in one specific message which use the same information element type.

An IE is typically TLIV (Type, Length, Instance, Value) encoded.

GTPv1 IE Type Extension Field

As already indicated above in the Background section, in order to cope with newly introduced features in 3GPP, quite a lot of new IE types are created in GTPv1. When introducing a new IE type for a new feature it is desired to use spare IE types (see e.g. IE types 217-238 in the above table of GTPv1 IE types), since this typically provides a cleaner protocol specification and a better backward compatible approach. For example, a new IE type can be safely discarded by a legacy receiver. However, this leads to less and less new IE types left as spare. Thus, the decreasing number of spare IE types may endanger an efficient support of more features in the GTPv1 protocol, which is a serious drawback.

Thus, in order to cope with newly introduced features in 3GPP, considering spare IE types are running out, which may endanger to efficiently support more features in the GTPv1 protocol, a mechanism to extend the existing IE type range is desired, preferably in a backward compatible manner.

Figure 9:
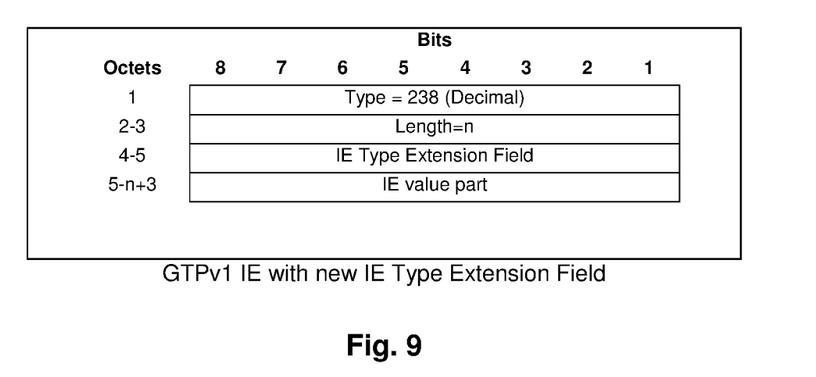
FIG. 9 is a schematic illustration of an exemplifying GTPv1 Information Element (IE) Type with new IE Type Extension Field.

FIG. 9 shows a schematic illustration of an exemplifying GTPv1 IE Type with a new IE Type Extension Field, providing an extended range of IE types. The new IE type is identified by a value encoded in the existing predefined IE Type Field in the first ($1^{st}$) Octet of the IE, plus an additional new value encoded in an IE type extension field. In this example, the existing predefined GTPv1 IE Type 238 is selected as a special IE type, i.e. one of the spare IE types 217-238 in the above table of GTPv1 IE types. However, any suitable existing predefined IE type in the above table of GTPv1 IE types may be used, e.g. such as any other of the spare IE types 217-237. The new IE type is defined by the existing predefined IE type encoded in the first ($1^{st}$) Octet of the IE as is commonly known, but now in combination with the additional value configured in a reserved IE Type Extension field, preferably in Octet 4 and 5 of the IE. The special IE type 238 corresponds to IE type 238 "Spare. For future use" in the above table of GTPv1 IE types. As indicated above, using an existing predefined spare IE type (e.g. as IE type 238) makes the solution backwards compatible, since such new IE types can be safely discarded by a legacy receiver. However, it should be added that other IE types than spare IE types may be used, but such embodiments may not be backwards compatible.

GTPv2 IE Type Extension Field

As already indicated above in the Background section, in order to cope with newly introduced features in 3GPP, quite a lot new IE types are created in GTPv2. When introducing a new IE type for a new feature it is desired to use spare IE types (see e.g. IE types 187-254 in the above table of GTPv2 IE types), since this typically provides a cleaner protocol specification and a better backward compatible approach. For example, a new IE type can be safely discarded by a legacy receiver. However, this leads to less and less new IE types left as spare. Thus, the decreasing number of spare IE types may endanger an efficient support of more features in the GTPv1 protocol, which is a serious drawback.

Thus, in order to cope with newly introduced features in 3GPP, considering spare IE type is running out, which may endanger to efficiently support more features in the GTPv2 protocol, a mechanism to extend the existing IE type range is desired, preferably in a backward compatible manner.

Figure 10:
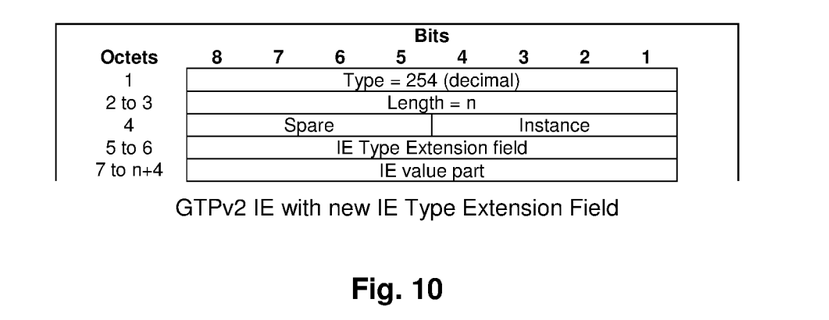
FIG. 10 is a schematic illustration of an exemplifying GTPv2 Information Element (IE) Type with new IE Type Extension Field.

FIG. 10 shows a schematic illustration of an exemplifying GTPv2 IE Type with new IE Type Extension Field, providing an extended range of IE types. The new IE type is identified by value encoded in the existing predefined IE Type Field in the first ($1^{st}$) Octet of the IE, plus an additional new value encoded in an IE type extension field. In this example, the existing predefined GTPv2 IE Type 254 is selected as a special IE type, i.e. one of the spare IE types 187-254 in the above table of GTPv2 IE types. However, any suitable existing predefined IE type in the above table of GTPv2 IE types may be used, e.g. such as any other of the spare IE types 187-253. The new IE type is defined by the existing predefined IE type encoded in the first ($1^{st}$) Octet of the IE as is commonly known, but now in combination with the additional value configured in a reserved IE Type Extension field, preferably in Octet 5 and 6 of the IE. The special IE type 254 corresponds to IE type 254 "Spare. For future use" in the above table of GTPv2 IE types. As indicated above, using an existing predefined spare IE type (e.g. as IE type 254) makes the solution backwards compatible, since such new IE types can be safely discarded by a legacy receiver. However, it should be added that other IE types than spare IE types may be used, but such embodiments may not be backwards compatible.

Figure 11:
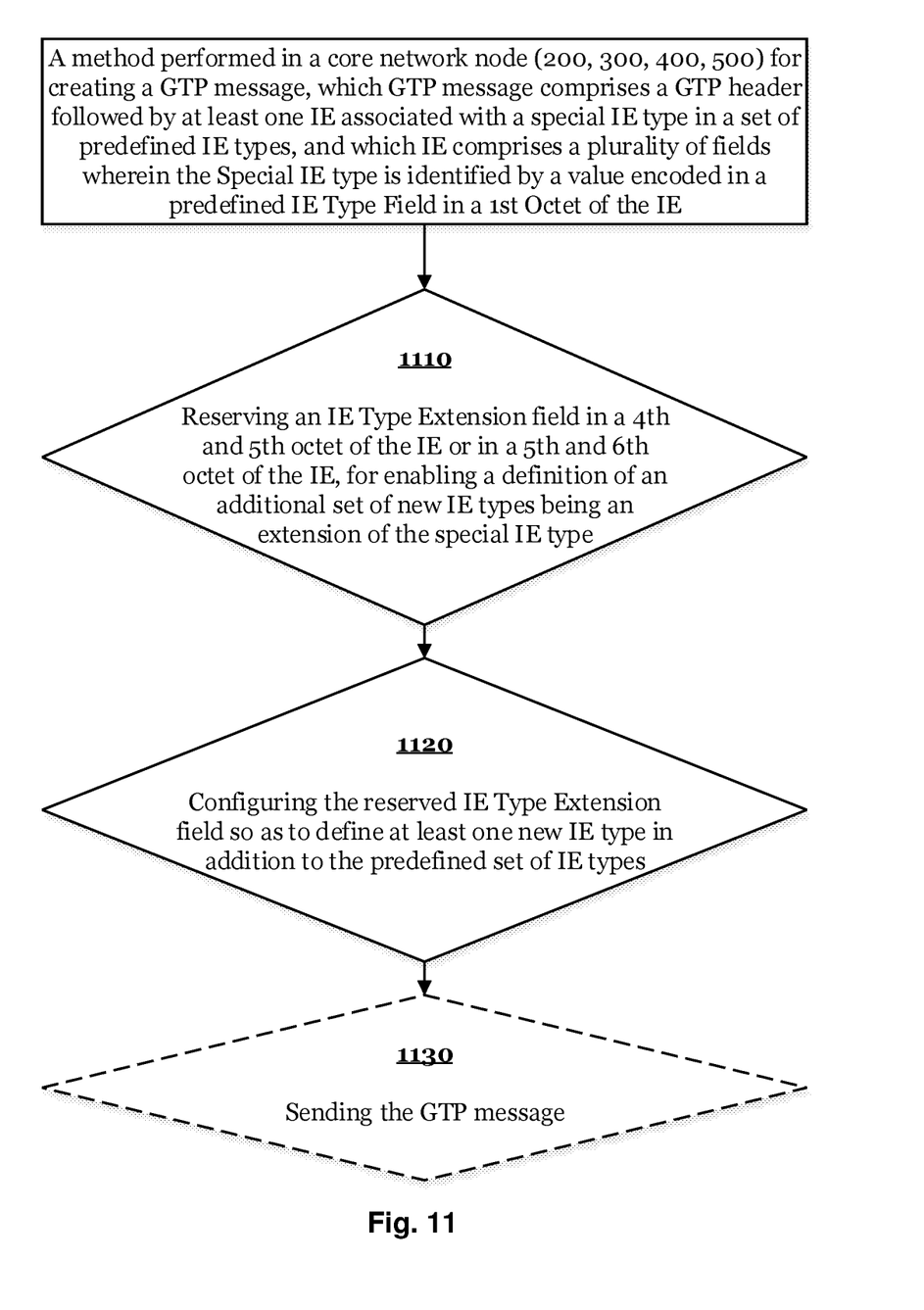
FIG. 11 shows an exemplifying flowchart that schematically illustrates exemplifying embodiments described herein.

FIG. 11 shows an exemplifying flowchart that schematically illustrates exemplifying embodiments described herein.

In figure ii a method is illustrated wherein core network node (200, 300, 400, 500) creates a GTP message. The GTP message comprises a GTP header followed by at least one IE associated with a special IE type in a set of predefined IE types. The IE comprises a plurality of fields wherein the special IE type is identified by a value encoded in an existing predefined IE Type Field in a first Octet of the IE, the method comprises:

A first action 1110 wherein an IE Type Extension field is reserved in a fourth and fifth octet of the IE or in a fifth and sixth octet of the IE, for enabling a definition of an additional set of new IE types being an extension of the special predefined IE type; and A second action 1120 wherein the reserved IE Type Extension field is configured so as to define at least one new IE type in addition to the predefined set of IE types.

Figure 12:
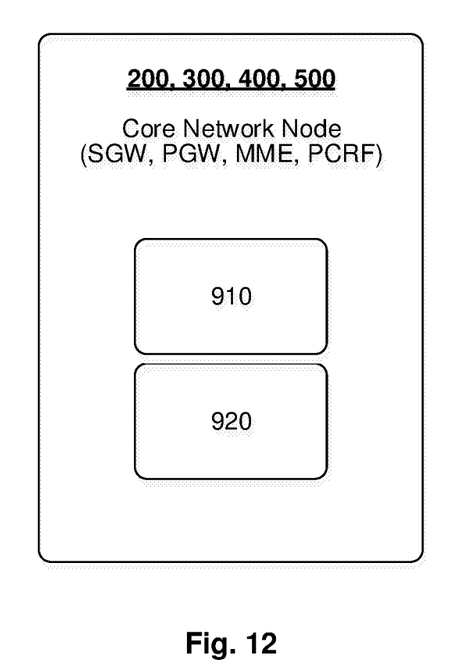
FIG. 12 is a schematic illustration of an exemplifying mobility management unit 200 configured to operatively perform the operations of the exemplifying embodiments described herein.

A third action 1110 wherein the GTO message is sent, e.g. sent to another core network node in a core network. This action may be optional FIG. 12 illustrates an exemplifying core network node configured to operatively perform the operations of the exemplifying embodiments described herein. As shown in FIG. 9, the core network node may comprise a processor arrangement 910 and a memory arrangement 920. The processor arrangement is preferably configured to operatively communicate with other core network nodes and units, e.g. as illustrated in FIG. 2 and to operatively execute instructions stored in the memory arrangement. The memory arrangement comprises instructions executable by said processor arrangement such that the exemplifying network node is configured to perform the operations of the exemplifying embodiments described herein. The processor arrangement 910 may comprise any suitable digital and analogue circuitry that enables it to execute the instructions stored in the memory arrangement so as to perform the operations and functions of the exemplifying embodiments described herein. The digital and analogue circuitry of the processor arrangement 910 and the memory arrangement 920 may e.g. be the same or similar as those in known core network nodes such as a SGW, PGW, MME or a PCRF or similar, whereas the instructions are specific for the embodiment described herein.

Some of the above disclosed example embodiments may be summarized in the following manner:

A first example embodiment is directed to a method performed in a core network node for creating a GTP message, which GTP message comprises a GTP header followed by at least one IE associated with a special IE type in a set of predefined IE types and which IE comprises a plurality of fields wherein the special IE type is identified by a value encoded in an predefined IE Type Field in a first Octet of the IE, the method comprising: reserving an IE Type Extension field in a fourth and fifth octet of the IE or in a fifth and sixth octet of the IE for enabling a definition of an additional set of new IE types being an extension of the special IE type; and configuring the reserved IE Type Extension field so as to define at least one new IE type in addition to the predefined set of IE types.

The method may further comprise: sending the GTP message.

The special predefined IE type may be a spare IE type reserved for future use.

The special predefined IE type may be a private extension IE type.

The core network node may be any one of: a SGW or a PGW or a MME or a PCRF.

Another example embodiment is directed to a core network node configured to operatively create a GTP message, which GTP message comprises a GTP header followed by at least one information element, IE, associated with a special IE type in a set of predefined IE types and which IE comprises a plurality of fields wherein the special IE type is identified by a value encoded in a predefined IE Type Field in a first Octet of the IE, where the core network node comprises a non-transitory memory with instructions, and a processor configured to operatively execute the instructions to: reserve an IE Type Extension field in a fourth and fifth octet of the IE or in a fifth and sixth octet of the IE for enabling a definition of an additional set of new IE types being an extension of the special IE type; and configure the reserved IE Type Extension field so as to define at least one new IE type in addition to the predefined set of IE types.

The core network node may be configured to operatively send the GTP message.

The special predefined IE type may be a spare IE type reserved for future use. The special predefined IE type may be a private extension IE type.

The core network node may be any one of: a SGW or a PGW or a MME or a PCRF.

The difference between a spare IE type and a reserved private extension IE type (and most other predefined IEs as well) is that a legacy receiver will trigger error handling if the sender is using a reserved IE type; while it will just silent drop a spared IE type if it doesn't understand the IE type.

As shown in the example embodiments above, the new reserved IE Type Extension field may comprise Octet 4 and 5 or Octet 5 and 6 in an IE, where each Octet comprises eight (8) binary bit each. Thus, the reserved field may comprise 2 octets, i.e. 2×8=16 bit. These 16 bit enables a definition of an additional set of 2*16=65536 new IE types being an extension of the special IE type.

Further, some embodiments may reserve further fields for enabling a definition of an additional set of new IE types being an extension of the special IE type. For example, octets 7 and 8 may be reserved in a second field in addition to octets 5 and 6 already reserved in a first field. Here, the exemplifying two (2) reserved fields may be added to each other so as to enable a definition of an additional set of p(2*n×8) new IE types, where the number of reserved fields is p=2 and the number of octets in each field is n=2. This enables a definition of an additional set of 2(2*(2×8))=2 (2*16)=2×65536=131072 new IE types. Alternatively, the exemplifying two (2) reserved fields may be concatenated to each other enabling a definition of an additional set of 2*pn8 new IE types, where the number of fields is p=2 and the number of octets in each field is n=2. This enables a definition of an additional set of 2*(2×2×8) =2*32=4294967296 new IE types. An addition of the reserved fields to each other seems easier and more backwards compatible, but may not define that many new IE types as may be the case at a concatenation of the reserved fields.

The IE may be Type, Value (TV) encoded or Type, Length, Value (TVL) encoded or Type, Length, Instance, Value (TLIV) encoded.

The predefined set of IE types may be defined in a type field comprising one (1) octet of eight (8) binary bit providing a set of 256 different predefined IE types.

The invention claimed is:

1. A method performed in a core network node for creating a General Packet Radio Service, GPRS, Tunneling Protocol, GTP, message, which GTP message comprises a GTP header followed by at least one information element, IE, associated with a special IE type in a set of predefined IE types and which IE comprises a plurality of fields wherein the special IE type is identified by a value encoded in a predefined IE Type Field in a first Octet of the IE, the method comprising:
reserving an IE Type Extension field in a fourth and fifth octet of the IE or in a fifth and sixth octet of the IE, for enabling a definition of an additional set of new IE types being an extension of the special IE type; and
configuring the reserved IE Type Extension field thereby defining at least one new IE type in addition to the predefined set of IE types.

2. The method according to claim 1, the method further comprising:
sending the GTP message.

3. The method according to claim 1, wherein the special predefined IE type is a spare IE type reserved for future use.

4. The method according to claim 1, wherein the special predefined IE type is a private extension IE type.

5. The method according to claim 1, wherein said core network node may be any one of a Serving Gateway, SGW, or a Packet Data Network, PDN Gateway, PGW, or a Mobility Management Entity, MME, or a Policy and Charging Rules Function, PCRF.

6. A core network node configured to operatively create a General Packet Radio Service, GPRS, Tunnelling Protocol, GTP, message, which GTP message comprises a GTP header followed by at least one information element, IE, associated with a special IE type in a set of predefined IE types and which IE comprises a plurality of fields wherein the special IE type is identified by a value encoded in a predefined IE Type Field in a first Octet of the IE, where the core network node comprises a memory with instructions, and a processor configured to operatively execute the instructions to:
reserve an IE Type Extension field in a fourth and fifth octet of the IE or in a fifth and sixth octet of the IE for enabling a definition of an additional set of new IE types being an extension of the special IE type; and
configure the reserved IE Type Extension field thereby defining at least one new IE type in addition to the predefined set of IE types.

7. The core network node according to claim 6, wherein the core network node is configured to operatively send the GTP message.

8. The core network node according to claim 6, wherein the special predefined IE type is a spare IE type reserved for future use.

9. The core network node according to claim 6, wherein the special predefined IE type is a private extension IE type.

10. The core network node according to claim 6, wherein the core network node is any one of a Serving Gateway, SGW, or a Packet Data Network, PDN, Gateway, PGW, or a Mobility Management Entity, MME, or a Policy and Charging Rules Function, PCRF.

* * * * *